(12) United States Patent
Goebel

(10) Patent No.: US 6,940,035 B2
(45) Date of Patent: Sep. 6, 2005

(54) STUD WELDING DEVICE WITH CONTACT PROTECTION

(75) Inventor: Bernhard Goebel, Lahnau (DE)

(73) Assignee: Newfrey LLC, Newark, DE (US)

( * ) Notice: Subject to any disclaimer, the term of this patent is extended or adjusted under 35 U.S.C. 154(b) by 615 days.

(21) Appl. No.: 09/933,249

(22) Filed: Aug. 20, 2001

(65) Prior Publication Data

US 2004/0164056 A1 Aug. 26, 2004

(30) Foreign Application Priority Data

Sep. 6, 2000 (DE) .......................................... 200 15 400

(51) Int. Cl.⁷ ................................................ B23K 9/20
(52) U.S. Cl. ........................................................ 219/98
(58) Field of Search ..................................... 219/98, 99

(56) References Cited

U.S. PATENT DOCUMENTS

| | | | | |
|---|---|---|---|---|
| 3,321,607 A | * | 5/1967 | Falcone et al. | ................ 219/98 |
| 3,582,602 A | * | 6/1971 | Ettinger et al. | ................ 219/98 |
| 4,027,136 A | * | 5/1977 | Taylor | ......................... 219/98 |
| 4,129,770 A | | 12/1978 | Gogolin et al. | |
| 4,201,904 A | | 5/1980 | Weidman | |
| 4,681,998 A | | 7/1987 | Kon | |

FOREIGN PATENT DOCUMENTS

| | | |
|---|---|---|
| DE | 9017279 | 4/1991 |
| FR | 2190563 | 2/1974 |
| GB | 1497133 | 1/1978 |
| GB | 735105 | 8/1995 |

OTHER PUBLICATIONS

Derwent English language abstract for document FR2190563A, published Mar. 8, 1974.*

* cited by examiner

Primary Examiner—Clifford C. Shaw
(74) Attorney, Agent, or Firm—Miles & Stockbridge P.C.

(57) ABSTRACT

A stud welding device (1) with a stud holder (3) having a pointed region (2) for holding a weld stud (4) and a device (5) designed as an insulating spacing means with a rim (7). The pointed region (2) of the stud holder (3) always remains behind the rim (7) of the spacing means, thereby preventing electrical contact between the pointed region (2) and a component (6). The stud welding device (1) is reduced in size because it is formed without a support foot.

1 Claim, 1 Drawing Sheet

STUD WELDING DEVICE WITH CONTACT PROTECTION

BACKGROUND OF THE INVENTION

The subject of the present invention is a stud welding device with a stud holder having a pointed region for holding a weld stud and a device for preventing an electrical contact between the pointed region of the stud holder and a component.

In the prior art, it is known to prevent an electrical contact between the pointed region of the stud holder and a component, for example a car body panel, by use of a so-called support foot which basically produces the mechanical primary contact between the stud welding device and the component when the stud welding device moves towards the component in order to weld a stud. This support foot is conventionally applied adjacent to the stud holder and therefore considerably increases the overall size of the stud welding device. Owing to increasing automation, it has become necessary to offer stud welding devices which are smaller in overall size but which have the same performance profile as stud welding devices with a support foot. The object of the present invention is therefore to provide a stud welding device that is considerably smaller in overall size but without forfeiting technical properties of previous stud welding devices.

SUMMARY OF THE PRESENT INVENTION

This object is achieved by the stud welding device according to the present invention with the features set forth and claimed herein.

The present invention makes it possible to remove the support foot in the stud welding device and keep the device small by utilizing the diameter of the stud holder and optionally of the substantially cylindrically formed spacer located around it, thus minimizing the overall size of the stud welding device, so areas of application which conventionally could not be reached by stud welding devices with a support foot can now be penetrated with the stud welding device according to the present invention.

Whilst it is possible to reduce the overall component size of a stud welding device simply by omitting the support foot, omission of the support foot runs the considerable risk that the pointed region of the stud holder is placed on the metal component and is permanently welded thereto. One of the most important functions of the support foot on stud welding devices is to avoid the potentially live pointed region of the stud holder in the unloaded state, i.e. without weld studs in the stud holder, resting on the metal component and being welded thereto. A welding of this type of stud holder and component, for example of a car body, is a catastrophic error which can lead to considerable damage to the production device and to the product to be produced, for example a car.

For this reason, the stud welding device, according to the present invention, provides that in addition to removal of the support foot to reduce the overall size, a device for preventing an electrical contact between the pointed region of the stud holder and a component is formed, this device being formed as insulating spacing means with a rim, so the pointed region of the stud holder always remains behind the rim of the spacing means.

This stud welding device, according to the present invention, has the advantage of being small in overall size and fulfilling all the technical functions and necessary properties of conventional stud welding devices at the same time.

In a first embodiment of the stud welding device, according to the present invention, the insulating spacing means are arranged substantially annularly round the pointed region. These insulating spacing means are preferably formed by a plastics material cylinder which is securely connected to the stud holder, so in the absence of the weld stud the conductive pointed region of the stud holder does not rest on the metal component and is not welded thereto, but the insulating spacing means rest on the metal component first of all. If no weld stud is then transported into the stud holder by the supply device coupled thereto, the stud welding device can if necessary draw attention to this faulty state by means of an appropriate signal.

Transportation as desired of a weld stud into the stud holder the tip of the weld stud projects substantially above the rim of the insulating spacing means in the direction of the component, so the primary contact is always produced between weld stud and component.

In a second embodiment, according to the present invention, the insulating spacing means is arranged on the rim of the pointed region of the stud holder, preferably in the form of a plastics material covering which is designed and arranged in such a way that effective insulation is achieved between component and stud holder with the appropriate electric operating currents and a primary contact.

In the first embodiment of the present invention has the advantage, furthermore, of having a still smaller overall size as the maximum size of the stud holder is substantially determined by the diameter of the weld stud. In the absence of a weld stud in the stud holder the plastics material coating of the stud holder therefore rests on the metal component first of all and welding of the stud holder to the component is avoided effectively by this insulating spacing means on the pointed region of the stud holder.

In the second embodiment of the present invention the insulating spacing means are also arranged on the terminal face of the pointed region of the stud holder and are non-detachably connected by plastics material pins to the terminal face.

BRIEF DESCRIPTION OF THE ACCOMPANYING DRAWINGS

The present invention will be explained in more detail with the aid of the FIGURES of a first and second embodiment thereof, in which.

DETAILED DESCRIPTION OF THE INVENTION

Figures 1A, 1B:
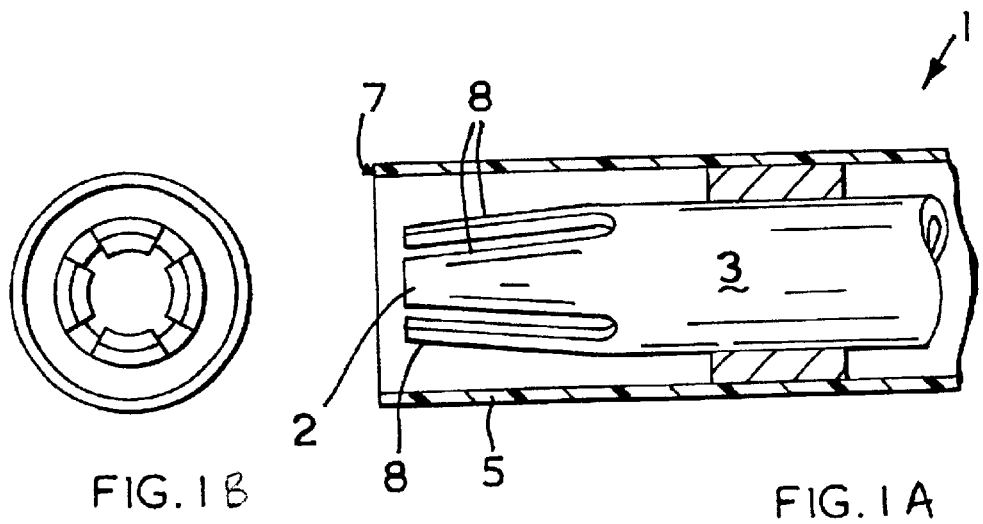
FIG. 1A shows a sectional view of a first embodiment of the stud welding device of the present invention.
FIG. 1B shows a plan view of the stud welding device of the present invention.
Figure 2:
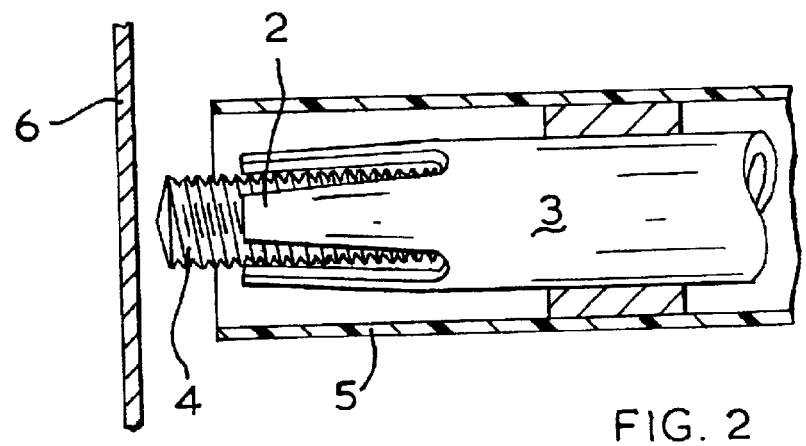
FIG. 2 shows the stud welding device according to the present invention in accordance with FIG. 1A with a weld stud, shortly before being welded onto a component.

In the stud welding device according to the invention in accordance with FIGS. 1A and 1B, a stud welding device 1 is shown which is tapered in its pointed region 2 and has tongues 8 which are formed in such a way that a weld stud 4 shown in FIG. 2 is pushed through the hollow tubular stud holder 1 to spread the tongues apart upon its arrival in the pointed region 2 owing to the forward movement force and can therefore subsequently be pushed out of the stud holder 1 completely.

A weld stud pushed through the stud holder 3 is pushed out of the stud holder 3 to a certain extent, as shown in FIG. 2, so it can be welded to a component 6. Once the weld stud 4 has been welded to the component 6 the entire stud welding device 1 is pulled back along the weld stud axis to release the weld stud completely. To protect the pointed region 2 of the stud welding device 1 according to the invention, a device 5 for preventing an electrical contact between the pointed region 2 of the stud holder 3 and the component 6 is provided round the pointed region 2.

In order to be able to fulfill the function of contact prevention, it is crucial that the device 5 has a rim 7 which must always be arranged between the pointed region 2 and the component 6. For when the stud welding device 1 according to the invention is positioned the primary contact between stud holder 1 and component 6 is produced on the rim 7, so no electrical energy can flow from the pointed region 2 into the component 6 which would lead to possible welding of the pointed region 2 to the component 6. In addition to the embodiment of a cylindrical tube portion made from an insulating material for the design of the device 5, it is also possible to form only effective spacers which ensure that, in the event that there is no weld stud 4 in the stud holder 3, no electric contact is produced between the pointed region 2 of the stud holder 3 and a component 6.

Figures 3A, 3B:
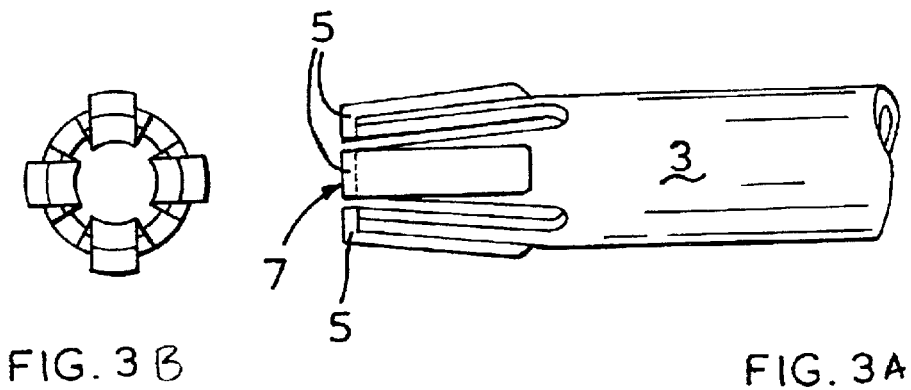
FIG. 3A shows a elevational view of a second embodiment of the stud welding device of the invention.
FIG. 3B shows a plan view of a elevational view of a second embodiment of the stud welding device of the present invention.

FIGS. 3A and 3B show a second embodiment of the stud welding device 1 according to the invention, the contact-preventing device 5 being directly connected to the pointed region 2 of the stud holder 3 in that an insulating layer of plastics material is applied or secured to the tongues 8, so an electrical contact can similarly be prevented between the pointed region 2 and a component 6.

In general, the above identified first and second embodiments are not to be construed as limiting the breadth of the present invention. It is understood that the present invention may be modified or have other alternative constructions that are apparent from and within the scope of the present invention as defined in the appended claims.

What is claimed is:

1. A stud welding device comprising:
a hollow tubular stud holder shaped for allowing a weld stud to be pushed therethrough and having a pointed region for holding a weld stud that projects from the stud holder, so that the weld stud can be welded to a component, and a device for preventing an electrical contact between the pointed region of the stud holder, and the component, the device being constructed as an insulating spacing means with a rim, wherein:
the insulating spacing means is arranged substantially annularly around the pointed region of the stud holder and is fixed relative to the stud holder, with the pointed region of the stud holder always remaining behind the rim of the spacing means.

* * * * *